United States Patent [19]

Hoffman et al.

[11] Patent Number: 5,045,121

[45] Date of Patent: Sep. 3, 1991

[54] METHOD FOR REMOVING CARBON FROM CEMENTED TUNGSTEN CARBIDE ARTICLES

[75] Inventors: Timothy J. Hoffman, Towanda; Robert G. Mendenhall, Athens; Michael J. Cheresnowsky, Towanda, all of Pa.

[73] Assignee: GTE Products Corporation, Stamford, Conn.

[21] Appl. No.: 649,328

[22] Filed: Feb. 4, 1991

Related U.S. Application Data

[63] Continuation of Ser. No. 369,447, Jun. 21, 1989, abandoned.

[51] Int. Cl.$^5$ .............................................. B08B 3/04
[52] U.S. Cl. .................................... 134/39; 210/759; 252/186.28; 423/440
[58] Field of Search ................ 134/39; 208/48 R; 210/759; 252/186.28, 516; 423/440, 584

[56] References Cited

U.S. PATENT DOCUMENTS 2,882,237  4/1959  Mahoney ........................ 252/186

FOREIGN PATENT DOCUMENTS 13055  5/1962  Japan ........................... 423/440

Primary Examiner—Theodore Morris
Assistant Examiner—Saeed Chaudhry
Attorney, Agent, or Firm—Elizabeth A. Levy; L, Rita Quatrini

[57] ABSTRACT

A method is disclosed for removing carbon from the surface of a cemented tungsten carbide article which comprises contacting a cemented tungsten carbide article with an aqueous solution of hydrogen peroxide having a concentration of at least about 5% by volume hydrogen perioxide for a sufficient length of time to remove the major portion of the carbon from the surfaces of the article.

3 Claims, No Drawings

METHOD FOR REMOVING CARBON FROM CEMENTED TUNGSTEN CARBIDE ARTICLES

This is a continuation of copending application Ser. No. 07/369,447, filed on June 21, 1989, now abandoned.

BACKGROUND OF THE INVENTION

This invention relates to a method for removing carbon from the surfaces of a cemented tungsten carbide articles by contacting the article with an aqueous solution of hydrogen peroxide.

Cemented tungsten carbide articles such as disks are used as mechanical parts. In the handling of these articles, they are subject to contamination by carbon. In order to remove the carbon satisfactorily so that the part can be reused such as in machines, they are sandblasted. This is an expensive procedure.

Therefore a relatively inexpensive method to remove carbon from such articles would be highly desirable and an advancement in the art.

SUMMARY OF THE INVENTION

In accordance with one aspect of the invention, there is provided a method for removing carbon from the surfaces of a cemented tungsten carbide article which comprises contacting a cemented tungsten carbide article with an aqueous solution of hydrogen peroxide having a concentration of at least about 5% by volume hydrogen peroxide for a sufficient length of time to remove the major portion of the carbon from the surfaces of the article.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The method of the present invention relates to removing carbon in essentially any form from cemented tungsten carbide articles by contact with an aqueous solution of hydrogen peroxide of a specific concentration range. The mechanism of removal of the carbon is believed to be due at least in part to the effervescent action of the peroxide on the surfaces of the densified article.

The type of article that is especially suited to the practice of the present invention, although the invention is not limited to such, is tungsten carbide articles having cobalt. Especially suited is tungsten carbide having a cobalt content of about 9% by weight. The article can be of any shape. However, most typically the article is in the shape of a disk.

The article or articles are contacted with an aqueous solution of hydrogen peroxide in which the hydrogen peroxide concentration is at least about 5% by volume, preferably from about 15% to about 35% by volume, and most preferably from about 33% to about 35% by volume. The length of time is sufficient to remove the major portion of the carbon from the surfaces of the article. The time depends on the size and shape of the article and on the concentration of the hydrogen peroxide. Most typically the contacting is done by immersing one or more articles in a bath of the hydrogen peroxide solution. It was found that various acids such as nitric, sulfuric, hydrochloric, aqua regia, citric, and hydrofluoric did not work on this type of densified article. Also bases such as sodium hydroxide and potassium hydroxide did not work. The difficulty encountered in cleaning this type of article with chemicals is believed to be due at least partially to the high density of the material. It was found unexpectedly that hydrogen peroxide is effective on for removing carbon from this type of material.

To more fully illustrate this invention, the following non-limiting example is presented.

EXAMPLE

Disks made of tungsten carbide having about 9% by weight cobalt and measuring about 1½" in diameter and about 1/16" thick are contacted with various cleaning agents. The disks are then examined visually for evidence of removal of carbon and for cleanliness. The results are given in the Table below.

TABLE

| Cleaning Agent | Result |
| --- | --- |
| $HNO_3$ (concentrated) | Unsatisfactory |
| $H_2SO_4$ (concentrated) | Unsatisfactory |
| HCl (concentrated) | Unsatisfactory |
| HF (concentrated) | Unsatisfactory |
| Aqua regia | Unsatisfactory |
| NaOH (50% wt. concentration) | Unsatisfactory |
| NaOH (30% wt. concentration) | Unsatisfactory |
| KOH (concentrated) | Unsatisfactory |
| $NaOH + H_2O_2$ | Unsatisfactory |
| $H_2O_2$ (3% by volume) | Unsatisfactory |
| $H_2O_2$ (33% by volume) | Satisfactory |

According to the Table the only agent of those listed that cleans the surfaces of the disks satisfactorily is the higher concentration of hydrogen peroxide.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for removing carbon from the surfaces of a cemented tungsten carbide article, said method consisting essentially of contacting a cemented tungsten carbide article with an aqueous solution of hydrogen peroxide having a concentration of at least about 5% by volume hydrogen peroxide for a sufficient length of time to remove the major portion of said carbon from the surfaces of said article.

2. A method of claim 1 wherein said concentration is from about 15% to about 35% by volume of hydrogen peroxide.

3. A method of claim 2 wherein said concentration is from about 33% to about 35% by volume of hydrogen peroxide.

* * * * *